T. B. TAYLOR.
Smoke and Cinder Fenders for Railroad Trains.

No. 214,967. Patented April 29, 1879.

WITNESSES:
Chas. Nida
C. Sedgwick

INVENTOR:
T. B. Taylor
BY Munn & Co
ATTORNEYS.

UNITED STATES PATENT OFFICE.

THOMAS B. TAYLOR, OF MOUNT MEIGS, ALABAMA.

IMPROVEMENT IN SMOKE AND CINDER FENDERS FOR RAILROAD-TRAINS.

Specification forming part of Letters Patent No. 214,967, dated April 29, 1879; application filed October 7, 1878.

*To all whom it may concern:*

Be it known that I, THOMAS B. TAYLOR, of Mount Meigs, in the county of Montgomery and State of Alabama, have invented a new and useful Improvement in Smoke and Cinder Fenders for Railroad-Trains, of which the following is a specification.

Figure 1:
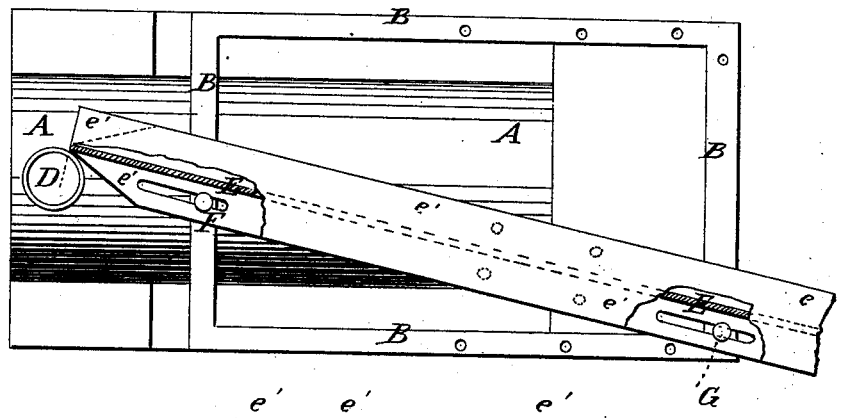
Figure 2:
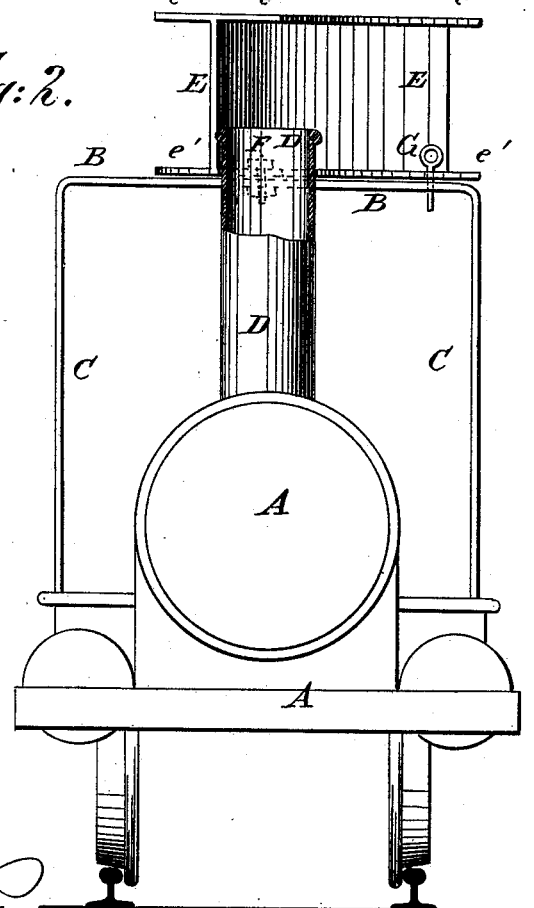

Figure 1 is a top view of my improved device, shown as applied to a locomotive-engine, parts being broken away to show the construction. Fig. 2 is a front view of the same.

Similar letters of reference indicate corresponding parts.

The object of this invention is to furnish an improved device for attachment to locomotive-engines to prevent the smoke, cinders, and dust from the smoke-stack from entering the cars, and thus to protect the passengers from annoyance from that cause.

The invention consists in the combination of the plate provided with flanges upon both sides of both side edges, and having slots and holes formed in its lower flanges to receive the fastening bolts or pins, and the supporting frame-work provided with holes to receive the said bolts or pins, with the frame and the smoke-stack of a locomotive-engine, as hereinafter fully described.

A represents a locomotive-engine, to the frame of which is attached a frame consisting of a horizontal frame, B, supported by uprights C, of such a height that the said horizontal frame B may be nearly as high as the top of the smoke-stack D of the said engine A.

Upon the horizontal frame B is placed a fender consisting of a plate, E, ten feet, more or less, in length and three or four feet wide, set edgewise, and provided with flanges $e'$ upon both sides of its side edges.

The fender E $e'$ is placed in an inclined position, with its forward end at one or the other side of the upper end of the smoke-stack D, and its rear end inclined toward one or the other side, according to the direction of the wind.

The forward ends of the lower flanges, $e'$, are beveled, so that the forward end of the plate E may come close to the side of the top of the smoke-stack D.

The forward end of the fender E $e'$ is secured in place by a bolt, F, which passes through a longitudinal slot in one of the flanges $e'$, and through a hole in the forward cross-bar of the frame B, so that the said fender E $e'$ can be drawn back, moved to the other side of the smoke-stack D, and again pushed forward without removing the said bolt F.

The rear end of the fender E $e'$ is secured in place by a pin or bolt, G, which passes through a hole or slot in one of the lower flanges, $e'$, and through a hole in the frame B. Several holes are formed through the lower flanges, $e'$, and through the frame B, to receive the pin or bolt G, so that the fender E $e'$ may be adjusted at any desired inclination toward either side, as circumstances may require.

With this construction, as the train moves forward, the fender E $e'$ will receive the smoke, cinders, and dust as they escape from the smoke-stack D and guide them to one side, and the draft caused by the motion of the train, supplemented by the wind, will give them such an impulse that they will be carried away from the cars, and will thus be kept from annoying the passengers.

The same device of inclined plane may be attached in the most convenient manner to the smoke-stacks of steamboats, or of any stationary works, for the same purpose, giving to the operator the entire control of his surroundings, that he may the better protect himself and his buildings from harm.

Having thus described my invention, I claim as new and desire to secure by Letters Patent—

The combination of the plate E, provided with flanges $e'$ upon both sides of both side edges, and having slots and holes formed in its lower flanges to receive the bolts or pins F G, and the frame-work B C, provided with holes to receive the said bolts or pins F G, with the frame and the smoke-stack of a locomotive-engine, substantially as herein shown and described.

THOMAS BURGE TAYLOR.

Witnesses:
ADOLPHUS GUSTAVUS SMITH,
REUBEN HENRY BREWER.